(12) United States Patent
Sundaresan

(10) Patent No.: US 7,080,064 B2
(45) Date of Patent: Jul. 18, 2006

(54) SYSTEM AND METHOD FOR INTEGRATING ON-LINE USER RATINGS OF BUSINESSES WITH SEARCH ENGINES

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 09/488,470

(22) Filed: Jan. 20, 2000

(65) Prior Publication Data

US 2003/0033298 A1    Feb. 13, 2003

(51) Int. Cl.
*G06F 7/00*    (2006.01)
(52) U.S. Cl. ..................... 707/3; 707/1; 707/5; 707/10; 705/1
(58) Field of Classification Search ............... 707/5, 707/3, 1, 10, 513; 705/1
See application file for complete search history.

(56) References Cited

U.S. PATENT DOCUMENTS

| | | | |
|---|---|---|---|
| 4,996,642 A | 2/1991 | Hey | 364/419 |
| 5,659,732 A | 8/1997 | Kirsch | 395/605 |
| 5,701,469 A | 12/1997 | Brandli et al. | 395/613 |
| 5,758,324 A * | 5/1998 | Hartman et al. | 705/1 |
| 5,790,426 A | 8/1998 | Robinson | 364/554 |

(Continued)

OTHER PUBLICATIONS

BizRate.com, Making the Web a Safer, Better Place to Shop!, <http://web.archive.org/web/19981205082910/http://www.bizrate.com/>, copyright 1997, 1998 Binary Compass Enterprises, pp. 1-29.*

(Continued)

*Primary Examiner*—Tim Vo
*Assistant Examiner*—Hung Pham
(74) *Attorney, Agent, or Firm*—Samuel A. Kassatly

(57) ABSTRACT

A computer program product is provided as a business rating system to rank business that are relevant to a given Internet search topic. Business ratings are stored in a ranking repository that can be optionally searched by the user along with a user-defined search engine query. The business ratings are compiled from on-line questionnaires attached to the search engine results and/or on-line surveys obtained through other web based rating services. The business ratings assess the quality of the businesses in terms of "interactive" criteria such as customer satisfaction, professionalism, and cost and ease of use of the businesses' products or services. The business rating system is comprised of an on-line indexing engine, a query transformer, a search results transformer, a ranking based result sorter, an on-line ranking system, a metadata repository, and an on-line ranking repository. The business rating system integrates the ratings with the search results, and ranks the search results based on such business ratings. In this manner, the user of a search engine receives feedback from other users about businesses of interest. Eventually, businesses with higher ratings will be ranked at the top of the search list, while business with lower ratings will be ranked lower.

32 Claims, 5 Drawing Sheets

U.S. PATENT DOCUMENTS

| | | | |
|---|---|---|---|
| 5,802,515 A * | 9/1998 | Adar et al. | 707/5 |
| 5,864,863 A | 1/1999 | Burrows | 707/103 |
| 5,875,446 A | 2/1999 | Brown et al. | 707/3 |
| 5,878,233 A | 3/1999 | Schloss | 395/200.55 |
| 5,884,282 A | 3/1999 | Robinson | 705/27 |
| 5,890,152 A * | 3/1999 | Rapaport et al. | 707/6 |
| 5,893,098 A * | 4/1999 | Peters et al. | 707/10 |
| 6,006,218 A * | 12/1999 | Breese et al. | 707/3 |
| 6,185,558 B1 * | 2/2001 | Bowman et al. | 707/5 |
| 6,269,361 B1 * | 7/2001 | Davis et al. | 707/3 |
| 6,272,507 B1 * | 8/2001 | Pirolli et al. | 707/513 |
| 6,314,420 B1 * | 11/2001 | Lang et al. | 707/3 |
| 6,321,228 B1 * | 11/2001 | Crandall et al. | 707/10 |

OTHER PUBLICATIONS

"Nielsen//NetRatings Search Engine Ratings" published on the Word Wide Web at URL: http://www.searchenginewatch.com/reports/netratings.html, as of Jan. 13, 2000.

"How Search Engines Rank Web Pages" published on the Word Wide Web at URL: http://searchenginewatch.internet.com/webmasters/rank.html, as of Jan. 13, 2000.

"Ratings, Reviews and Tests" published on the Word Wide Web at URL: http://www.searchenginewatch.com/reports/index.html, as of Jan. 13, 2000.

* cited by examiner

Hair: List of matches related to hair provided by SearchEngineX
1. Hair stylist–colorist, Arizona, AZ   185
   Hair salon, European & Italian Hair...
   URL: www.hairaz.com/lonilopez/default.asp
   Last modified 25-May-99-page size 4K- [Current Rating 3]
   Please Rate

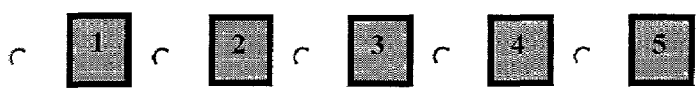

2. Cut-It -Out
   Hair cuts for men and boys ...   455
   URL: www.cutitout.com/prices/index.htm
   Last modified 22-Feb-99-page size 3K- [Current Rating 2]
   Please Rate

3. Sam's Style Cuts
   Contemporary style cuts by Sam...
   URL: www.samstyle.com/sam/main.htm
   Last modified 16-Aug-99-page size 5K- [Current Rating 4]
   Please Rate

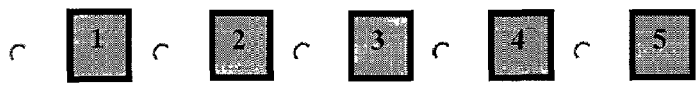

4. Cut's-R-Us
   Fast friendly full hair styling service...
   URL: www.cutsrus.com/hair/index.htm
   Last modified 5-Sept-99-page size 4K- [Current Rating 2]
   Please Rate

5. Hair Emporium
   Hair salon, 99 W. El Camino, Sunnyvale, CA ...
   URL: www.hairemporium.com/styling/default.asp
   Last modified 28-Oct-99-page size 6K- [Current Rating None]
   Please Rate

FIG. 4

SYSTEM AND METHOD FOR INTEGRATING ON-LINE USER RATINGS OF BUSINESSES WITH SEARCH ENGINES

CROSS-REFERENCE TO RELATED APPLICATIONS

This application is related to patent application Ser. No. 09/488,471 titled "System and Method for Integrating Off-Line Ratings of Businesses with Search Engines" which is filed by the same assignee as this application on even date herewith, and which is incorporated herein by reference in its entirety.

FIELD OF THE INVENTION

The present invention relates to the field of information retrieval, and particularly to a computer software product and associated method for ranking search results based on ratings of businesses from on-line sources.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler systematically accesses web pages, by sequentially following hypertext links from page to page. The crawler indexes the pages for use by the search engines using information about a web page as provided by its address or Universal Resource Locator (URL), metadata, context, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

Current search engines use a variety of criteria to order matches to the user query and to rank the search results with higher quality pages listed at the top of the search list. Assessing quality involves both accurately matching the user query and identifying a useful, current web page. For instance, search engines may order the matches based on what is referred to herein as "static criteria". Exemplary static criteria are the highest popularity, most recently updated, most visited, most queried, or most interconnected. It is common for users to limit the review of their search to only the first few matches of the search list.

For consumers searching the WWW for businesses, the search methods employed by current search engines provide incomplete information for the users to assess the quality of the businesses. The information provided by authors about their web sites, and the number of visits or queries received by a business site, typically reflect the quality of the web pages, but do not provide information about the quality of the business.

There is currently no adequate mechanism by which searches of business sites can be ordered based upon interactive criteria about the businesses themselves, correlating higher quality search matches to higher business satisfaction ratings. For example, popularity, is a commonly used static criterion which is determined by the number of visits or queries of business sites, and which may depend on advertising, strategic business alliances, or creative naming of a site, and is therefore independent of customers satisfaction with the ranked businesses. Therefore, there is still an unsatisfied need for a system and method that integrate user provided interactive criteria, such as customers and on-line users' satisfaction, with search engine results.

SUMMARY OF THE INVENTION

In accordance with the present invention, a computer program product includes an information repository that contains ratings of web site businesses. The ratings provided in this repository are integrated into the search engine results. The business ratings can be compiled from various on-line sources attached to the search engine results. Exemplary on-line sources include questionnaires and other on-line surveys obtained through other web based rating services. The business ratings assess the quality of the businesses in terms of "interactive" criteria such as customer satisfaction, professionalism, and cost and ease of use of products or services.

The business rating system is comprised of an on-line indexing engine, a query transformer, a search results transformer, a ranking based result sorter, an on-line ranking system, a metadata repository, and an on-line ranking repository. The business rating system integrates the ratings with the search results, and ranks and presents the integrated search results to the user based on such ratings. In this manner, the user of a search engine receives feedback from other users and/or customers about businesses of interest. Those businesses with higher ratings are ranked at the top of the search list.

In operation, the user enters a query in the user interface of the search engine. The search engine searches the metadata repository for sites that match the user query, and also searches the business ratings repository. One or more sites in the metadata search results may correspond to matches in the business ratings search. The search engine determines the rank of each corresponding site in the ranking database and ranks the search results based on interactive criteria about the businesses. The ranked results are then presented to the on-line user.

In a preferred embodiment, the users complete and submit on-line surveys that are integrated with the search engine results. The information provided by the users is recorded and evaluated for the purpose of ranking the businesses. The ratings are made available to future users of the search engines. In another embodiment, in addition to a numerical rating system, the current on-line users may include descriptive annotations regarding customer satisfaction to be read by future users. In this manner, qualitative as well as quantitative feedback may be provided by the current users and examined by future users.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4 is an exemplary viewport illustrating an on-line rating survey used by the business rating system of FIG. 1 to rank search results.

DETAILED DESCRIPTION OF THE INVENTION

Figure 1:
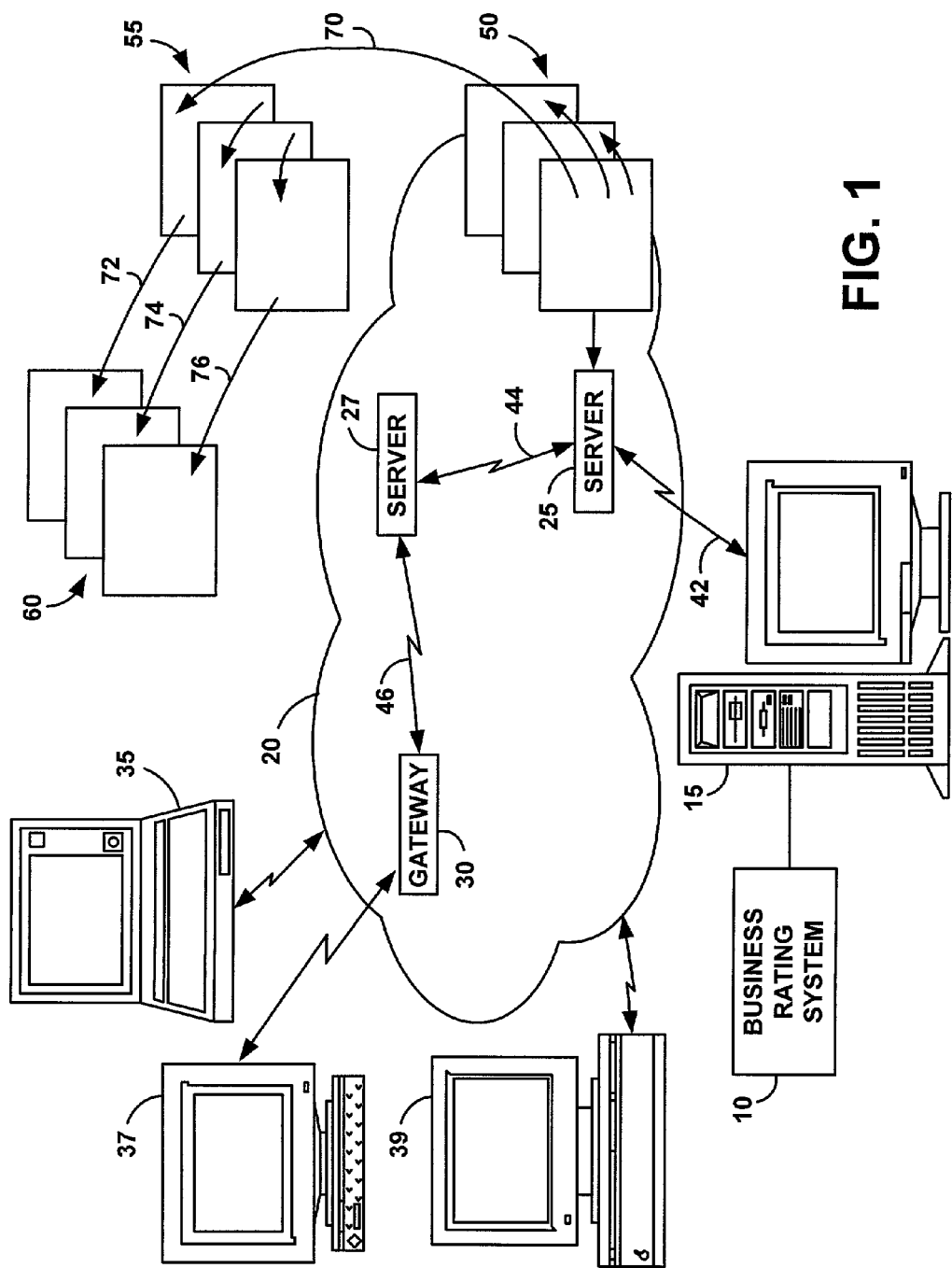
FIG. 1 is a schematic illustration of an exemplary operating environment in which a business rating system of the present invention may be used.

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Search engine: A remotely accessible World Wide Web tool that allows users to conduct keyword searches for information on the Internet.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client-server hypertext distributed information retrieval system.

FIG. 1 portrays the overall environment in which a business rating system 10 according to the present invention may be used. The business rating system 10 includes a software or computer program product which is typically embedded within, or installed on a host server 15 and integrated with a web browser. Alternatively, the business rating system 10 can be saved on a suitable storage medium such as a diskette, a CD, a hard drive, or like devices. Although the business rating system 10 will be described in connection with the WWW, it should be clear that the business rating system 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the business rating system 10 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
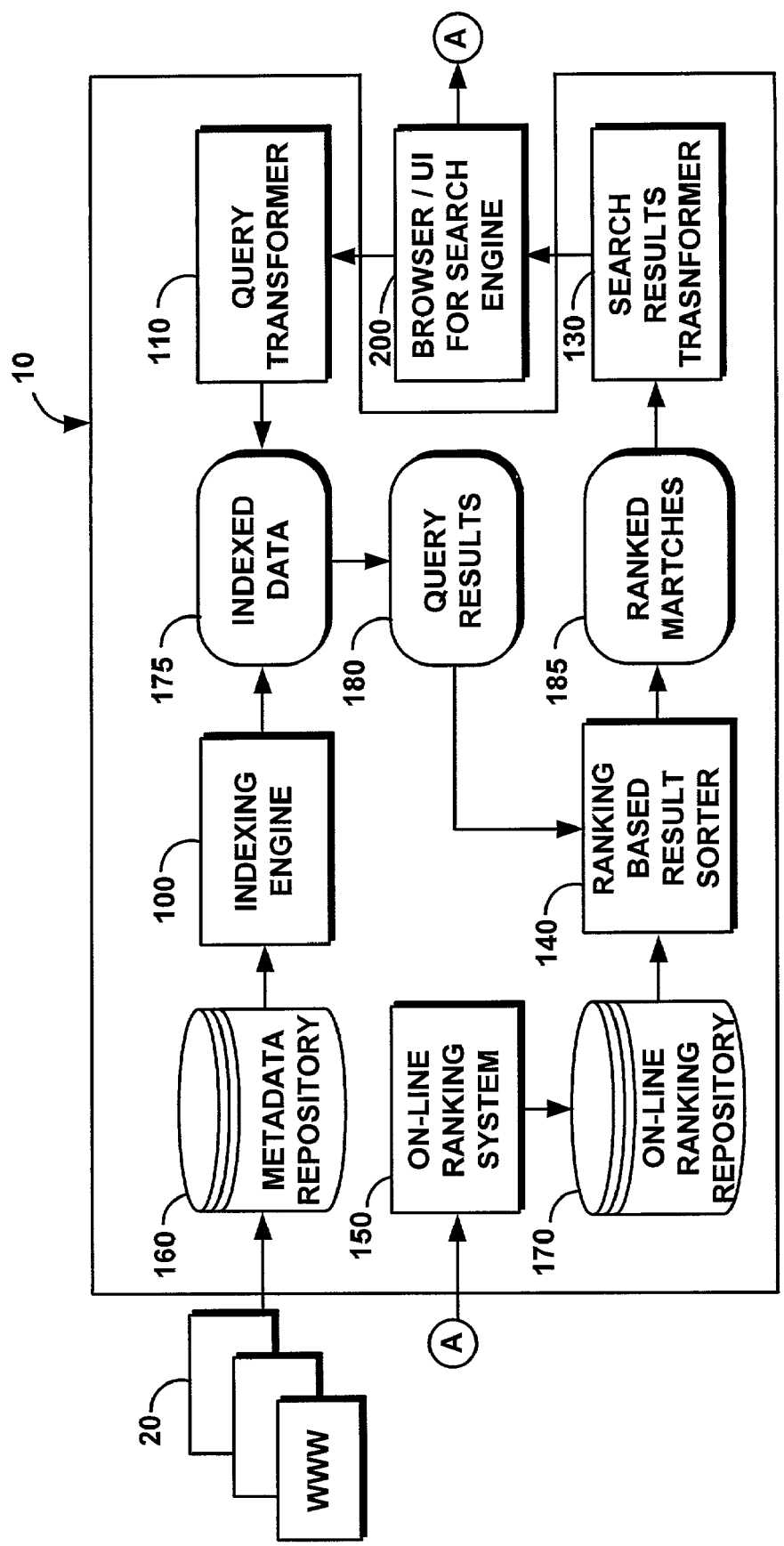
FIG. 2 is a block diagram of the architecture of the business rating system of FIG. 1, shown employing an on-line ranking system.

The business rating system 10 will now be described with further reference to FIG. 2. The business rating system 10 includes a computer program product such as a software package, which is generally comprised of an on-line indexing engine 100, a query transformer 110, a search results transformer 130, a ranking based result sorter 140, an on-line ranking system 150, a metadata repository 160, and an on-line ranking repository 170.

In use, the crawler visits and downloads web documents to the metadata repository 160 where they are stored and updated systematically. The web documents are then indexed by the indexing engine 100 to generate indexed data 175. The on-line ranking system 150 receives users' on-line surveys or feedbacks, and generates ranking data for storage in the on-line ranking repository 170. While the business rating system 10 is described as including two repositories 160, 170, it should be clear these two repositories 160, 170 can be functionally combined in a single database.

The query transformer 110, prompted by a user browser 200, applies an internal query request to the indexed data 175, and generates query results (or matches) 180 that are specific to the user's query. The ranking based result sorter 140 sorts the query results 180 based on the rating data from the on-line ranking repository 170, and generates ranked matches 185. Once the query matches are sorted or ranked according to business ratings and/or other factors, the ranked matches 185 are transformed into viewable or browsable form (i.e., HTML) by the transformer 130. The transformed data is subsequently presented to the user at the user interface (UI) or browser 200.

According to one embodiment, the user has the option to complete a business ratings survey form 455 (FIG. 4) presented with the search results (whether or not the search results are ranked or not), for submitting new rating information regarding the businesses to the on-line ranking system 150. This new rating information will be integrated with the rating data already stored in the on-line ranking repository 170 for use in subsequent searches.

Figure 3A:
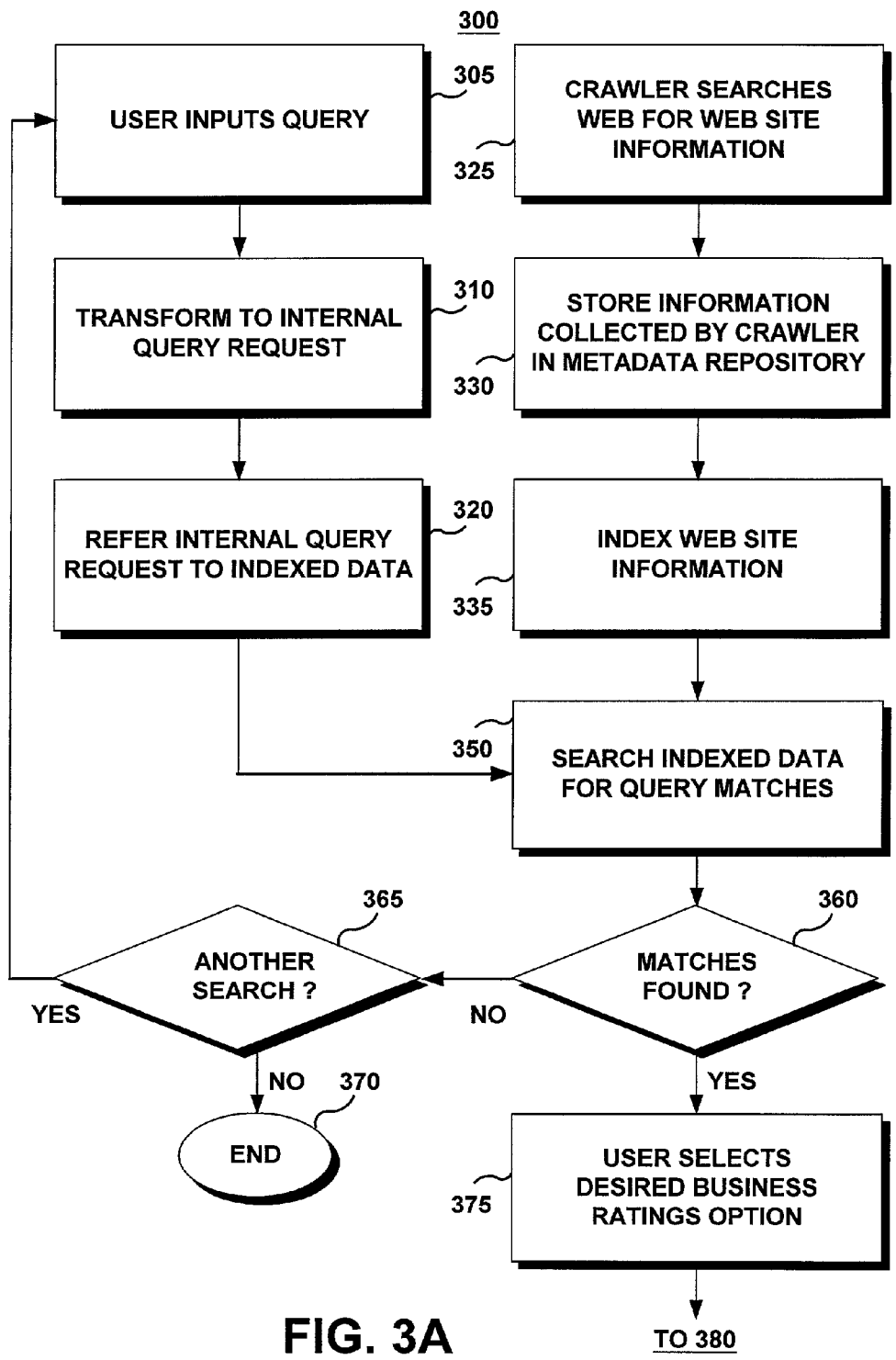
FIG. 3 is comprised of FIGS. 3A and 3B, and represents a flow chart depicting the operation of the business rating system of FIG. 1.
Figure 3B:
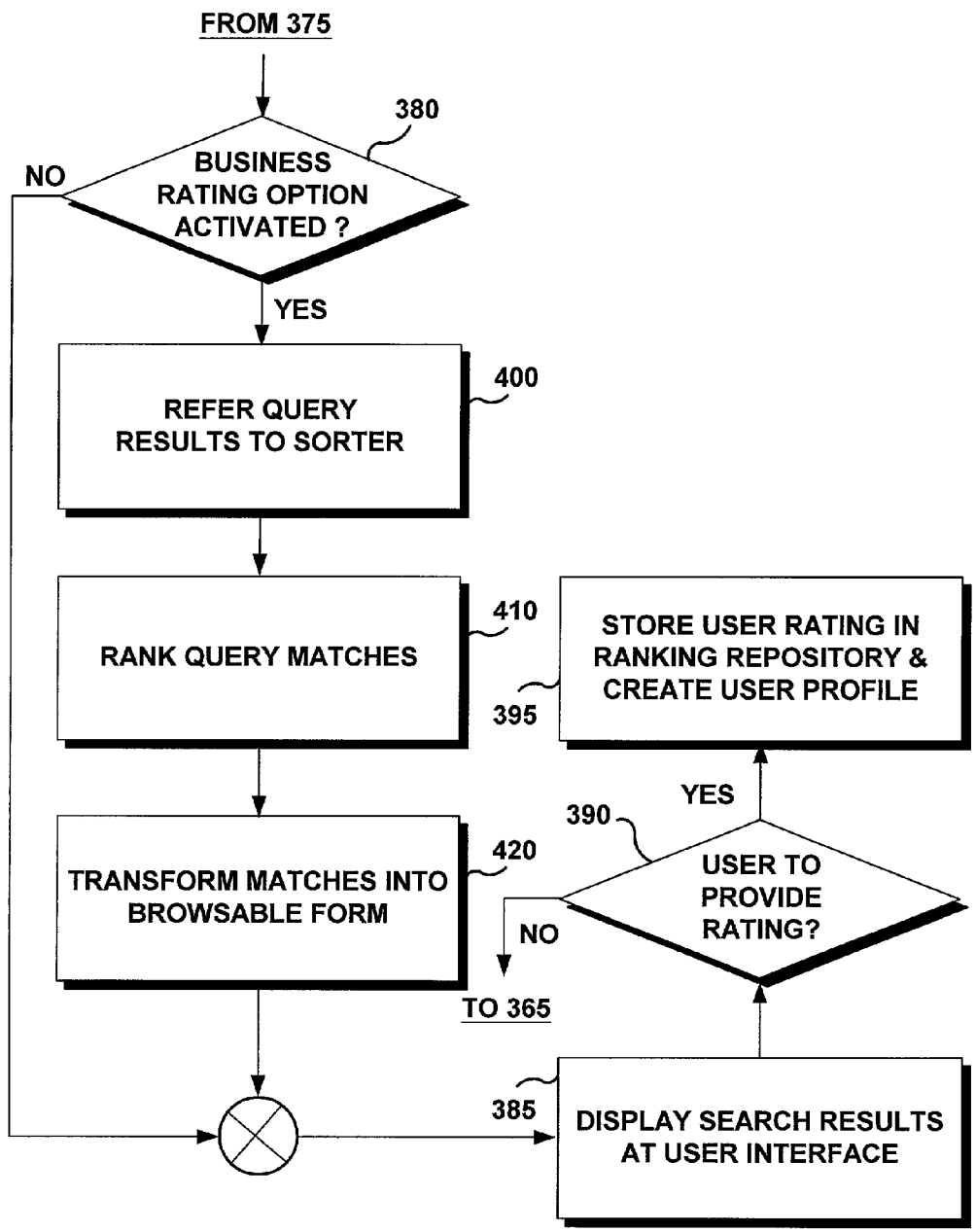

Having described the main components of the business ratings system 10, its operation will now be explained in connection with FIGS. 2 through 4. The method of operation 300 of the business rating system 10 of FIG. 2 is illustrated in the flowchart of FIG. 3 (FIGS. 3A and 3B). The user submits a query to the business rating system 10 using the user interface 200 at step 305. The user query is transformed at step 310 into a query request that is internal or proprietary to the search engine, by means of the query transformer 110.

At step 320, the internal query request is referred to the indexed data 175. The compilation of the indexed data 175 is carried out in advance, and is depicted at blocks or steps 325, 330, and 335 of FIG. 3A. The compilation of the indexed data 175 starts at step 325 by having one or more crawlers search the WWW 20, and download the web documents to the metadata repository 160 at step 330. At step 335, the indexing engine 100 indexes the content of the web documents or the metadata of the web documents, and stores the indexed data in the metadata repository 160 or in another dedicated database.

For a given query generated at step 305, and for a database of indexed data 175, the method 300 searches the indexed data 175 for query matches at step 350. The step of matching the query against the indexed data is executed by the search engine. Discovering relevant matches is carried out by discovering instances where the user defined search words significantly overlap with those in the indexed data 175.

At decision block 360, the method 300 determines whether or not matches have been found within the indexed data 175. If no matches are found the user is prompted for another search at step 365. An affirmative answer to the inquiry at step 365 returns the user to the search engine interface 200 (step 305). A negative answer to this inquiry ends the search session at step 370.

If, however, the method 300 determines at step 360 that matches have been discovered, it proceeds to block 375 where the user selects the desired business rating option. For example the user can activate or turn off the business rating feature using the browser 200. In another embodiment, the user can select or toggle specific rating features ON or OFF. For example, the user can choose to order the matches to be ranked primarily according to other users' satisfaction and secondarily according to business competence, while disregarding price comparison.

The process 300 then inquires at decision block 380 if the user has activated the business rating option. A negative result directs the business rating system 10 to output the search results, at step 385, without reordering (or ranking) based on the business ratings. The search results could still be ranked according to conventional static criteria. The user is then prompted at step 390 to rank the businesses in the search results. If the user elects to provide rating data, the browser 200 sends the rating data to the business rating system 10 where it is stored in the on-line ranking repository 170 at step 395.

The rating data is stored in the ranking repository 170 in several fields, such as: the URL of the web site or address of the document; the business rating provided by the user; and the user's e-mail address. The user's e-mail address is recorded in an effort to create a user's profile history. This profile history enables the user to update or override the rating previously provided by this user but not the ratings provided by other users.

If at step 390 the user elects not to provide rating data, the method 300 advances to decision step 365 and therefrom proceeds as described earlier.

In the event of an affirmative response to the inquiry at step 380, the query results 180 are then referred to the ranking based result sorter 140 at step 400, where the query results 180 are cross-referenced with the items stored in the ranking repository 170. At step 410, the sorter 140 ranks the query matches 185 accounting for the on-line provided ratings. In one embodiment, the user controls the ranking of the query matches by selecting and prioritizing the parameters according to which the query matches are ranked. The ranked (or re-ordered) matches 185 are then transformed into a browsable form at step 420, and displayed at the user interface 200, at step 385, wherefrom the method 300 proceeds to decision step 390 as described earlier.

Decision step 390 will now be illustrated with reference to FIG. 4 that shows an exemplary viewport 450 listing five matches 185 that are rated, and ranked in part based on their respective ratings. In this example, the user-defined query is for "hair stylist", and the corresponding search result created by the business rating system 10 includes fives matches 185. Upon the user's request to rank the business, the user is presented with the search results as well as the "Current Ratings" of the business. The user is also presented with a graphical on-line rating survey 455 which is integrated with the query results 185. The cumulative rating computation can be weighted based upon other ratings a particular user may have provided. Several rating schemes can be used to enhance the ranking quality. The business rating system 10 may simply provide a list of count of "5"s, "4"s, "3"s, "2"s, and "1"s ratings for a business.

By providing the ratings for a site across from its occurrence in a search result, a user can select the business that best suits that particular user's needs. In addition, the business rating system 10 is a self correcting system in that after a certain period of use, the users' interactive ratings could significantly affect the ranking of the businesses, and ultimately, lower ranked businesses stand lower chances of being browsed and thus selected. For example, if a user selects a site that had an initially high ranking and was not satisfied with the business, that user gives a poor rating to the business. If a reasonable number of users give a similarly poor rating to the same business, the business site will automatically ranked lower.

It is to be understood that the specific embodiments of the invention that have been described are merely illustrative of certain application of the principle of the present invention.

Numerous modifications may be made to the business ratings system and associated method described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A self-correcting system for use with a search engine to rank search results based upon a ranking of businesses that are selected from an unrestricted pool of merchants, comprising:

an on-line ranking system for receiving any of users' on-line surveys or feedback about businesses;

the on-line ranking system generating rating data from the any of the users' on-line surveys or feedback;

wherein the rating data correlates higher quality search matches to higher business satisfaction ratings;

wherein the on-line ranking system indexes the rating data;

an on-line ranking repository for storing the rating data indexed by the on-line ranking system;

a result sorter for sorting query results generated by the search engine, based on the rating data from the on-line ranking repository, and for generating ranked matches;

a profile manager for creating a user profile history from a user's address;

wherein the user profile history enables the user to update a rating that was previously provided by the user, and disables the user from revising ratings provided by other users; and wherein updated cumulative business satisfaction ratings from the users' on-line surveys or feedback automatically cause the on-line ranking system to re-index the rating data, and further cause the result sorter to generate ranked matches based on the re-indexed rating data.

2. The system according to claim 1, further including a search results transformer that converts the ranked matches to a user browsable form.

3. The system according to claim 2, further including an indexing engine that indexes web documents to generate indexed data.

4. The system according to claim 3, further including a metadata repository for storing web documents that have been downloaded on-line.

5. The system according to claim 3, further including a query transformer which, when prompted by a query, applies a query request to the indexed data and generates the query results.

6. The system according to claim 1, wherein the any of the users' on-line surveys or feedback include annotations.

7. The system according to claim 1, wherein the any of the users' on-line surveys or feedback include any one or more of a questionnaire, a survey, or a web based rating service.

8. The system according to claim 1, wherein the interactive criteria assess the quality of a business in terms of any one or more of: customer satisfaction, professionalism, cost, and ease of use of a product or service.

9. A self-correcting computer program product for use with a search engine to rank search results based upon a ranking of businesses that are selected from an unrestricted pool of merchants, comprising:

an on-line ranking system for receiving any of users' on-line surveys or feedback about businesses;

the on-line ranking system generating rating data from the any of the users' on-line surveys or feedback;

wherein the rating data correlates higher quality search matches to higher business satisfaction ratings;

wherein the on-line ranking system indexes the rating data;

an on-line ranking repository for storing the rating data indexed by the on-line ranking system;

a result sorter for sorting query results generated by the search engine, based on the rating data from the on-line ranking repository, and for generating ranked matches;

a profile manager for creating a user profile history from a user's address;

wherein the user profile history enables the user to update a rating that was previously provided by the user, and disables the user from revising ratings provided by other users; and wherein updated cumulative business satisfaction ratings from the users' on-line surveys or feedback automatically cause the on-line ranking system to re-index the rating data, and further cause the result sorter to generate ranked matches based on the re-indexed rating data.

10. The computer program product according to claim 9, further including a search results transformer that converts the ranked matches to a user browsable form.

11. The computer program product according to claim 10, further including an indexing engine that indexes web documents to generate indexed data.

12. The computer program product according to claim 11, further including a metadata repository for storing web documents that have been downloaded on-line.

13. The computer program product according to claim 11, further including a query transformer which, when prompted by a query, applies a query request to the indexed data and generates the query results.

14. The computer program product according to claim 9, wherein the any of the users' on-line surveys or feedback include an on-line feedback with annotations.

15. The computer program product according to claim 9, wherein the any of the users' on-line surveys or feedback include any one or more of a questionnaire, a survey, or a web based rating service.

16. The computer program product according to claim 9, wherein the interactive criteria assess the quality of a business in terms of any one or more of: customer satisfaction, professionalism, cost, and ease of use of a product or service.

17. A method for use with a search engine to self-correctively rank search results based upon a ranking of businesses that are selected from an unrestricted pool of merchants, comprising:

receiving any of users' on-line surveys or feedback about businesses;

generating rating data from the any of the users' on-line surveys or feedback;

wherein the rating data correlates higher quality search matches to higher business satisfaction ratings;

indexing the rating data by means of an on-line ranking system;

storing the rating data indexed by the on-line ranking system, in an on-line ranking repository;

sorting query results generated by the search engine, based on the rating data from the on-line ranking repository, and for generating ranked matches;

creating a user profile history from a user's address;

wherein the user profile history enables the user to update a rating that was previously provided by the user, and disables the user from revising ratings provided by other users; and wherein updated cumulative business satisfaction ratings from the users' on-line surveys or feedback automatically cause the on-line ranking system to re-index the rating data, and further cause the result sorter to generate ranked matches based on the re-indexed rating data.

18. The method according to claim 17, further including transforming the ranked matches into a user browsable form.

19. The method according to claim 18, further including indexing web documents to generate indexed data.

20. The method according to claim 19, further including storing web documents that have been downloaded on-line.

21. The method according to claim 19, further including applying a query request to the indexed data for generating the query results.

22. The method according to claim 17, wherein receiving rating data includes compiling rating data from on-line feedback with annotations.

23. The method according to claim 17, wherein receiving rating data includes compiling rating data from any one or more of a questionnaire, a survey, or a web based rating service.

24. The method according to claim 17, further including compiling rating data based on interactive criteria that assess the quality of a business in terms of any one or more of: customer satisfaction, professionalism, cost, and ease of use of a product or service.

25. A search result service for use with a search engine to self-correctively rank search results based upon a ranking of businesses that are selected from an unrestricted pool of merchants, comprising:

receiving any of users' on-line surveys or feedback about businesses;

generating rating data from the any of the users' on-line surveys or feedback;

wherein the rating data correlates higher quality search matches to higher business satisfaction ratings;

indexing the rating data by means of an on-line ranking system;

storing the rating data indexed by the on-line ranking system, in an on-line ranking repository;

sorting query results generated by the search engine, based on the rating data from the on-line ranking repository, and for generating ranked matches;

creating a user profile history from a user's address;

wherein the user profile history enables the user to update a rating that was previously provided by the user, and disables the user from revising ratings provided by other users; and wherein updated cumulative business satisfaction ratings from the users' on-line surveys or feedback automatically cause the on-line ranking system to re-index the rating data, and further cause the result sorter to generate ranked matches based on the re-indexed rating data.

26. The search result service according to claim 25, further comprising transforming the ranked matches into a user browsable form.

27. The search result service according to claim 26, further comprising indexing web documents to generate indexed data.

28. The search result service according to claim 27, further comprising storing web documents that have been downloaded on-line.

29. The search result service according to claim 27, further comprising applying a query request to the indexed data for generating the query results.

30. The search result service according to claim 25, wherein receiving rating data comprises compiling rating data from on-line feedback with annotations.

31. The search result service according to claim 25, wherein receiving rating data comprises compiling rating data from any one or more of a questionnaire, a survey, or a web based rating service.

32. The search result service according to claim 25, further comprising compiling rating data based on interactive criteria that assess the quality of a business in terms of any one or more of: customer satisfaction, professionalism, cost, and ease of use of a product or service.

* * * * *